United States Patent
Rokade et al.

(10) Patent No.: US 10,684,676 B2
(45) Date of Patent: Jun. 16, 2020

(54) SIMULATING AND EVALUATING SAFE BEHAVIORS USING VIRTUAL REALITY AND AUGMENTED REALITY

(71) Applicant: Honeywell International Inc., Morris Plains, NJ (US)

(72) Inventors: Vishram Rokade, Shajapur (IN); Amol Gandhi, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 23 days.

(21) Appl. No.: 16/019,198

(22) Filed: Jun. 26, 2018

(65) Prior Publication Data
US 2019/0146577 A1   May 16, 2019

Related U.S. Application Data

(60) Provisional application No. 62/584,305, filed on Nov. 10, 2017.

(51) Int. Cl.
| | |
|---|---|
| *G06F 3/01* | (2006.01) |
| *G06T 19/00* | (2011.01) |
| *G02B 27/01* | (2006.01) |
| *G09B 9/00* | (2006.01) |
| *G09B 5/02* | (2006.01) |

(52) U.S. Cl.
CPC .......... *G06F 3/011* (2013.01); *G02B 27/0172* (2013.01); *G06T 19/006* (2013.01); *G09B 5/02* (2013.01); *G09B 9/00* (2013.01)

(58) Field of Classification Search
CPC ... G06F 3/011; G02B 27/0172; G06T 19/006; G09B 5/02; G09B 9/00
See application file for complete search history.

(56) References Cited

U.S. PATENT DOCUMENTS

| | | |
|---|---|---|
| 6,500,008 B1 | 12/2002 | Ebersole et al. |
| 2002/0167536 A1 | 11/2002 | Valdes et al. |
| 2003/0210228 A1 | 11/2003 | Ebersole et al. |
| 2005/0168403 A1* | 8/2005 | Ebersole, Jr. .......... A62B 18/04 345/8 |
| 2010/0313146 A1 | 12/2010 | Nielsen et al. |
| 2011/0270135 A1 | 11/2011 | Dooley et al. |
| 2013/0089845 A1* | 4/2013 | Hutchison ............ G09B 19/003 434/257 |
| 2013/0189656 A1 | 7/2013 | Zboray et al. |
| 2013/0189658 A1 | 7/2013 | Peters et al. |
| 2017/0148214 A1 | 5/2017 | Muniz-Simas et al. |

(Continued)

*Primary Examiner* — Rodney Amadiz

(57) ABSTRACT

A system, method, and apparatus for virtual reality and augmented reality training comprises a headset for displaying at least one virtual object, at least one processor, and a storage device communicatively coupled to the at least one processor, the storage device storing instructions which, when executed by the at least one processor, cause the at least one processor to perform operations comprising: providing a virtual environment, providing one or more demonstration steps, providing one or more practice steps, collecting the user's real world physical movements, collecting the user's virtual decisions, evaluating the user's virtual decisions and physical movements to determine if the virtual decisions and the physical movements constitute safe behavior and correcting an incorrect physical movement and an incorrect virtual decision.

19 Claims, 8 Drawing Sheets

(56) References Cited

U.S. PATENT DOCUMENTS

2018/0225993 A1* 8/2018 Buras .................... A61B 8/06
2018/0295419 A1* 10/2018 Thielen ................ G09B 5/065
2018/0374383 A1* 12/2018 Thielen .............. G09B 19/0038

* cited by examiner

SIMULATING AND EVALUATING SAFE BEHAVIORS USING VIRTUAL REALITY AND AUGMENTED REALITY

CROSS REFERENCE TO RELATED PATENT APPLICATIONS

This patent application claims priority under 35 U.S.C. § 119(e) to and the benefit of U.S. provisional patent application 62/584,305 entitled "Simulating and Evaluating Safe Behaviors Using Virtual Reality and Augmented Reality", which was filed on Nov. 10, 2017. U.S. Provisional Patent Application Ser. No. 62/584,305 is incorporated herein by reference in its entirety.

TECHNICAL FIELD

Embodiments are generally related to the field of computer simulations. Embodiments are also related to the virtually reality. Embodiments are also related to the augmented reality. Embodiments are further related to methods and systems for simulating and evaluating safe behaviors using virtual and augmented reality.

BACKGROUND

Personnel safety is increasingly identified as the primary force in decision making in industrial applications. All production and financial targets, in industries ranging from petrochemicals and refining to the software industry, are secondary to safety concerns. Thus, it is increasingly comment for employees, contractors, and visitors to be briefed on aware safety risks present at a work location.

Many industries are also required to comply with safety standards like OSHAS 18001/BSC. OHSAS 18001 is an internationally recognized occupational, health, and safety management system series standard. Requirements for OHSAS 18001 Occupation health and safety management system include formulation of an Occupational, Health and Safety Management System (OHSMS) with the establishment of an occupational, health and safety (OHS) manual in which the scope of OHSMS is determined; establish an occupational, health, and safety policy and OHS objectives and programs; ensure document and record control; implement and maintain a procedure to identify hazards, assess risk and determine controls in the work place; ensure applicable occupational, health, and safety legislation is identified, communicated within and compliance assessed; define resources, roles, responsibilities, accountability, and authority with regard to the OHSMS; implement an adequate occupational, health, and safety communication, participation, and consultation process; maintain good operational control; plan emergency preparedness and response; meet strict criteria in relation to incident investigation; identify and deal with OHS non conformities by applying corrective and preventative action; monitor and measure the occupational, health, and safety performance of the organization; and audit the system and review the system at a management level periodically.

In certain industries, training mechanisms are used to train people to identify and avoid potential hazards. These training mechanisms range from showing presentations and making people aware of scenarios to live training exercises (e.g., mock drills, firefighting training, etc.). In prior approaches, there is no means for evaluating the trainee's behavior. As such, it can be difficult to evaluate if a trainee truly understands the risks associated with the potential hazard.

There are two particular categories in the work force that are uniquely prone to work related safety hazards: people who are new to the work place (i.e., those with less experience), and people who have worked around the hazard for an extended period of time (such people have the knowledge to correctly answer safety evaluation questions, but may not adhere to safe behavior standards in practice).

Accordingly, there is a need for systems and methods that create real life-like scenarios that do not expose the trainee to a real hazard, while also providing the ability to monitor and evaluate the response of an individual to such situations. Such methods and systems are disclosed herein.

SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide computer simulations.

It is another aspect of the disclosed embodiments to provide a method, system, and apparatus for the virtually reality.

It is another aspect of the disclosed embodiments to provide a method, system, and apparatus for the augmented reality.

It is another aspect of the disclosed embodiments to simulate and evaluate safe behaviors using virtual and augmented reality.

It is another aspect of the disclosed embodiments to provide systems and methods to collect video data of a real-world location and convert that data into a virtual representation of the real-world location.

It is yet another aspect of the disclosed embodiments to provided stored safety training exercises using augmented reality and virtual reality.

It will be appreciated that the methods and systems can be achieved according to the embodiments disclosed herein. In one such embodiment, a system, method, and/or apparatus comprises a headset for displaying at least one virtual object, at least one processor, and a storage device communicatively coupled to the at least one processor, the storage device storing instructions which, when executed by the at least one processor, cause the at least one processor to perform operations comprising: providing a virtual environment, providing one or more demonstration steps, providing one or more practice steps, collecting the user's real world physical movements, collecting the user's virtual decisions, evaluating the user's virtual decisions and physical movements to determine if the virtual decisions and the physical movements constitute safe behavior, and correcting an incorrect physical movement and an incorrect virtual decision. In an embodiment the headset comprises one of: a virtual reality headset and an augmented reality headset.

In one embodiment the one or more demonstration steps comprise illustrating an appropriate PPE, and illustrating an appropriate behavior to safely complete a task. In an embodiment the one or more practice steps comprise: prompting a user to select an appropriate virtual PPE, and prompting a user to perform an appropriate behavior to safely complete a task. In an embodiment the system further comprises comparing the user's performed behavior to safely complete the task with a stored set of acceptable behaviors to complete the task.

In an embodiment the system further comprises a video camera for collecting video data of a real-world location wherein the video data is converted to the virtual environment. In an embodiment the video data is used to construct the virtual environment, emulating the real-world location.

In another embodiment the virtual environment comprises at least one of: a plant, a manufacturing facility, an office, and a video recorded environment.

BRIEF DESCRIPTION OF THE FIGURES

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
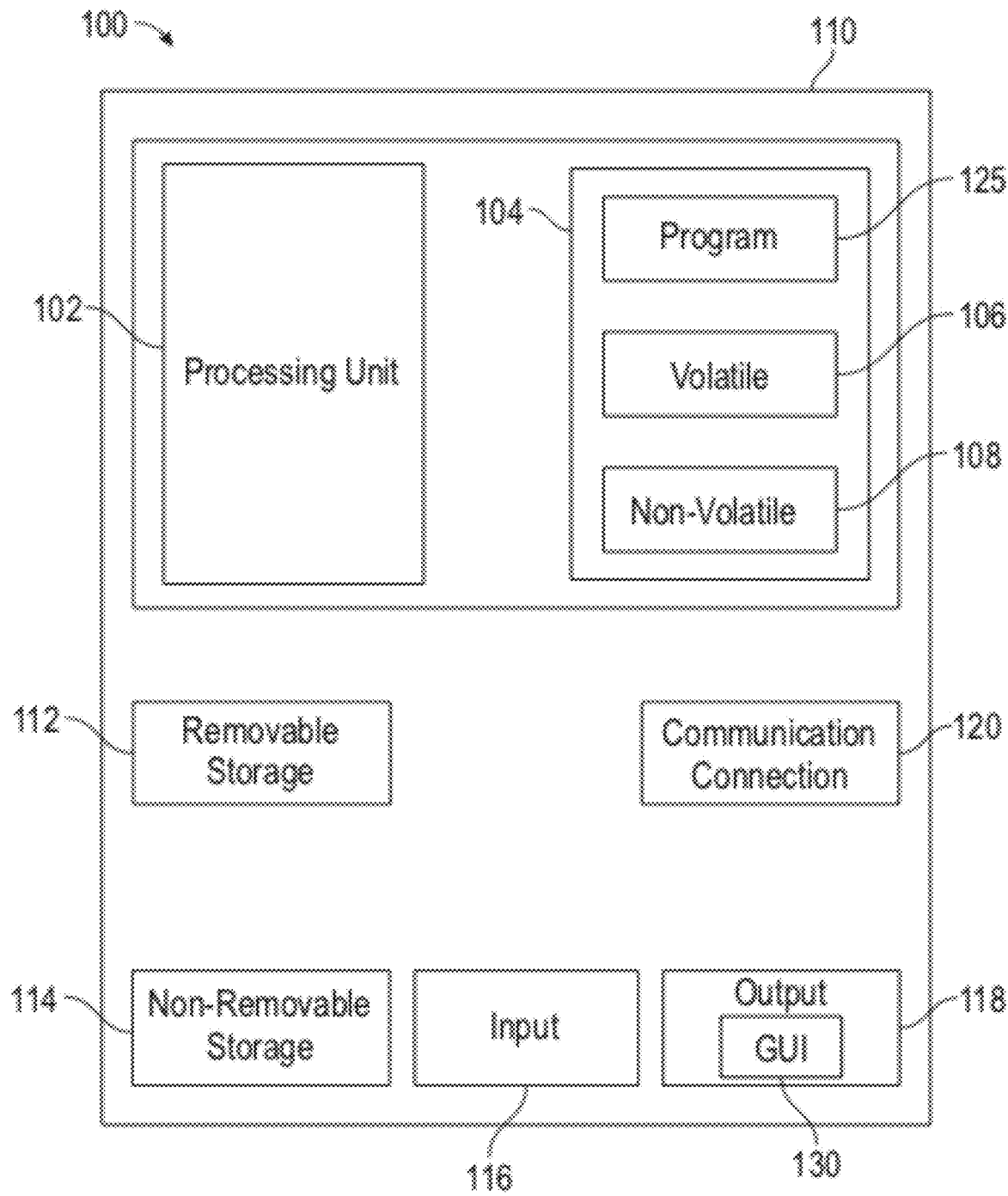
FIG. 1 depicts a block diagram of a computer system which is implemented in accordance with the disclosed embodiments.
Figure 2:
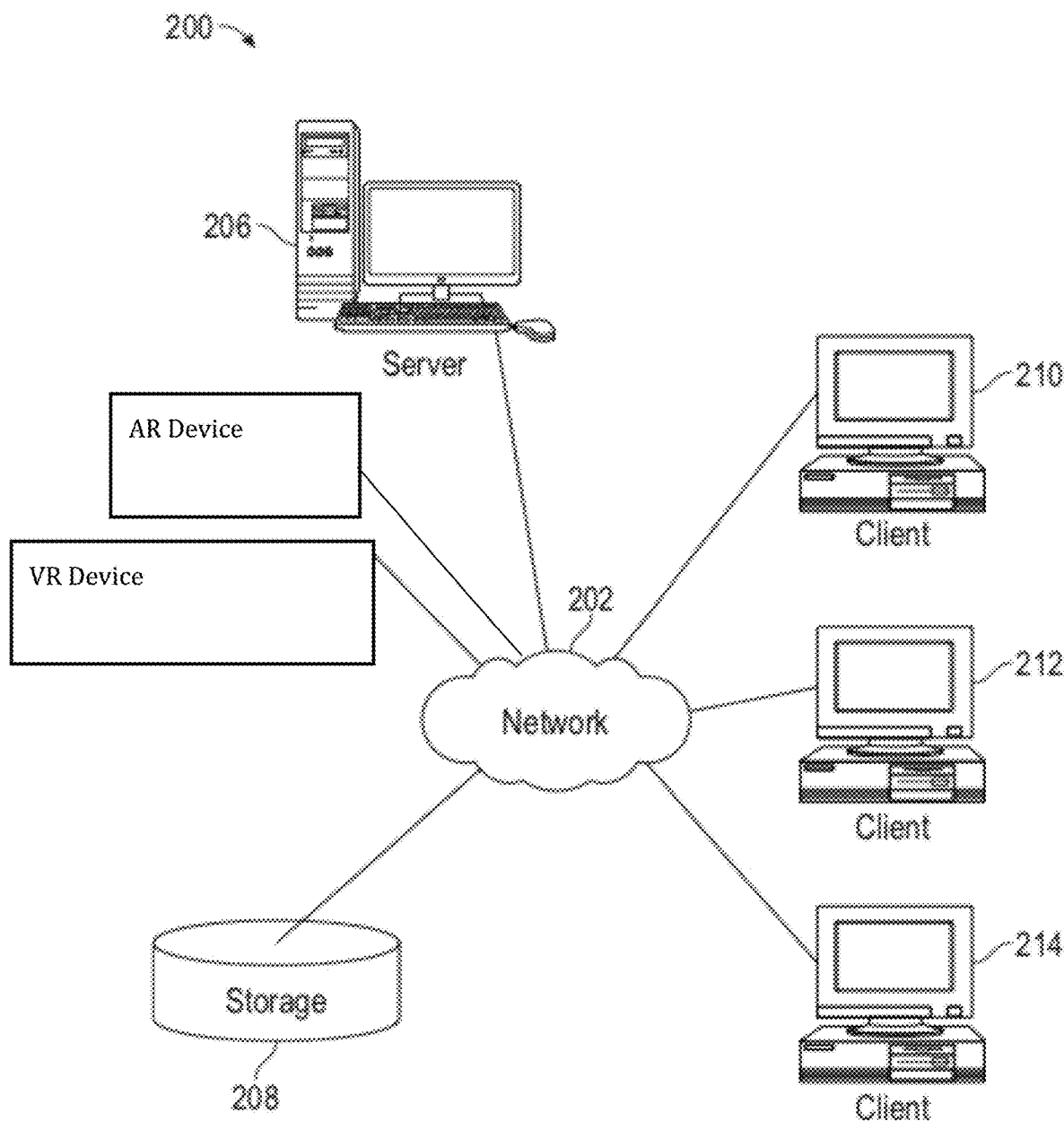
FIG. 2 depicts a graphical representation of a network of data-processing devices in which aspects of the present embodiments may be implemented.
Figure 3:
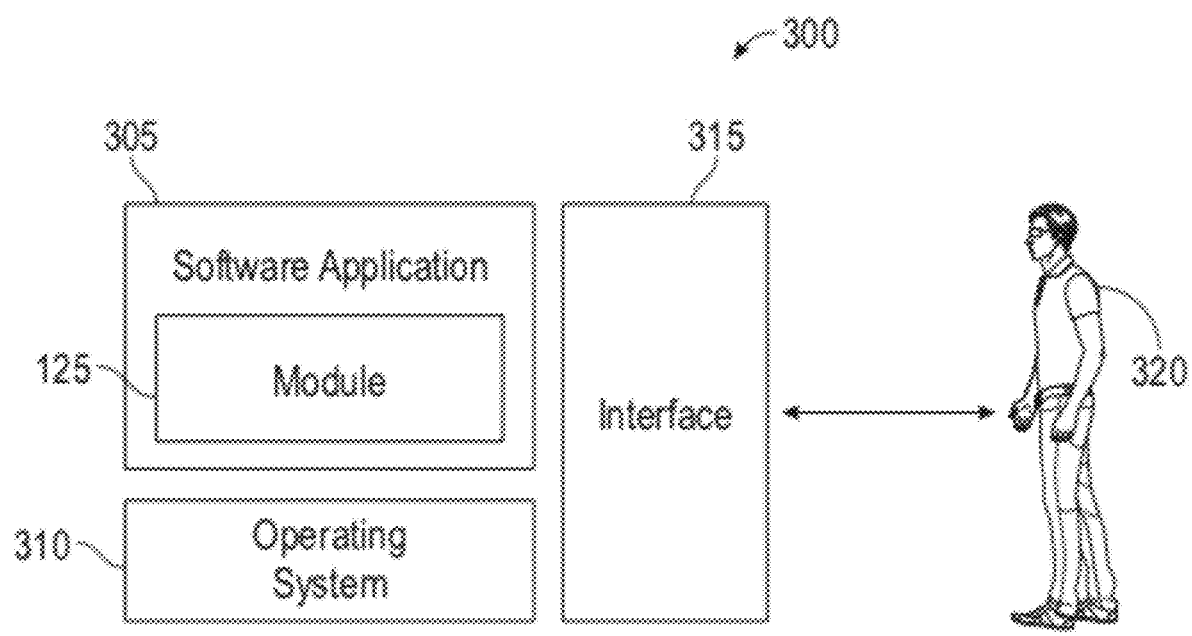
FIG. 3 depicts a computer software system for directing the operation of the data-processing system depicted in FIG. 1, in accordance with an example embodiment.

FIGS. 1-3 are provided as exemplary diagrams of data-processing environments in which embodiments may be implemented. It should be appreciated that FIGS. 1-3 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

A block diagram of a computer system 100 that executes programming for implementing the methods and systems disclosed herein is shown in FIG. 1. A general computing device in the form of a computer 110 may include a processing unit 102, memory 104, removable storage 112, and non-removable storage 114. Memory 104 may include volatile memory 106 and non-volatile memory 108. Computer 110 may include or have access to a computing environment that includes a variety of transitory and non-transitory computer-readable media such as volatile memory 106 and non-volatile memory 108, removable storage 112 and non-removable storage 114. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data, including data comprising frames of video.

Computer 110 may include or have access to a computing environment that includes input 116, output 118, and a communication connection 120. The computer may operate in a networked environment using a communication connection to connect to one or more remote computers or devices. The remote computer may include a personal computer (PC), server, router, network PC, a peer device or other common network node, or the like. The remote device may include a sensor, photographic camera, video camera, tracking device, or the like. The communication connection may include a Local Area Network (LAN), a Wide Area Network (WAN), or other networks. This functionality is described in more fully in the description associated with FIG. 2 below.

Output 118 is most commonly provided as a computer monitor, but may include any computer output device. Output 118 may also include a data collection apparatus associated with computer system 100. In addition, input 116, which commonly includes a computer keyboard and/or pointing device such as a computer mouse, computer track pad, or the like, allows a user to select and instruct computer system 100. A user interface can be provided using output 118 and input 116. Output 118 may function as a display for displaying data and information for a user and for interactively displaying a graphical user interface (GUI) 130.

Note that the term "GUI" generally refers to a type of environment that represents programs, files, options, and so forth by means of graphically displayed icons, menus, and dialog boxes on a computer monitor screen. A user can interact with the GUI to select and activate such options by directly touching the screen and/or pointing and clicking with a user input device 116 such as, for example, a pointing device such as a mouse and/or with a keyboard. A particular item can function in the same manner to the user in all applications because the GUI provides standard software routines (e.g., module 125) to handle these elements and report the user's actions. The GUI can further be used to display the electronic service image frames as discussed below.

Computer-readable instructions, for example, program module 125, which can be representative of other modules described herein, are stored on a computer-readable medium and are executable by the processing unit 102 of computer 110. Program module 125 may include a computer application. A hard drive, CD-ROM, RAM, Flash Memory, and a USB drive are just some examples of articles including a computer-readable medium.

FIG. 2 depicts a graphical representation of a network of data-processing systems 200 in which aspects of the present embodiments may be implemented. Network data-processing system 200 is a network of computers in which embodiments may be implemented. Note that the system 200 can be implemented in the context of a software module such as program module 125. The system 200 includes a network 202 in communication with one or more clients 210, 212, and 214. Network 202 is a medium that can be used to provide communications links between various devices and computers connected together within a networked data processing system such as computer system 100. Network 202 may include connections such as wired communication links, wireless communication links, or fiber optic cables. Network 202 can further communicate with one or more servers 206, one or more external devices such as a multifunction device, mobile device, augmented reality (AR) device, or the like 204, a virtually reality (VR) device 205, and a memory storage unit such as, for example, memory or database 208.

In the depicted example, AR device 204, VR device 205, and server 206 connect to network 202 along with storage unit 208. In addition, clients 210, 212, and 214 connect to network 202. These clients 210, 212, and 214 may be, for example, personal computers or network computers. Computer system 100 depicted in FIG. 1 can be, for example, a client such as client 210, 212, and/or 214. Alternatively, clients 210, 212, and 214 may also be, for example, a photographic camera, video camera, tracking device, sensor, etc.

Computer system 100 can also be implemented as a server such as server 206, depending upon design considerations. In the depicted example, server 206 provides data such as boot files, operating system images, applications, and application updates to clients 210, 212, and 214, and/or to AR device 204, and VR device 205. Clients 210, 212, and 214 and AR device 204 or VR device 205 are clients to server 206 in this example. Network data-processing system 200 may include additional servers, clients, and other devices not shown. Specifically, clients may connect to any member of a network of servers, which provide equivalent content.

In the depicted example, network data-processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages. Of course, network data-processing system 200 may also be implemented as a number of different types of networks such as, for example, an intranet, a local area network (LAN), or a wide area network (WAN). FIGS. 1 and 2 are intended as examples and not as architectural limitations for different embodiments.

FIG. 3 illustrates a computer software system 300, which may be employed for directing the operation of the data-processing systems such as computer system 100 depicted in FIG. 1. Software application 305, may be stored in memory 104, on removable storage 112, or on non-removable storage 114 shown in FIG. 1, and generally includes and/or is associated with a kernel or operating system 310 and a shell or interface 315. One or more application programs, such as module(s) 125, may be "loaded" (i.e., transferred from removable storage 112 into the memory 104) for execution by the data-processing system 100. The data-processing system 100 can receive user commands and data through user interface 315, which can include input 116 and output 118, accessible by a user 320. These inputs may then be acted upon by the computer system 100 in accordance with instructions from operating system 310 and/or software application 305 and any software module(s) 125 thereof.

Generally, program modules (e.g., module 125) can include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked personal computers, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application such as a computer program designed to assist in the performance of a specific task such as word processing, accounting, inventory management, etc.

The interface 315 (e.g., a graphical user interface 130) can serve to display results, whereupon a user 320 may supply additional inputs or terminate a particular session. In some embodiments, operating system 310 and GUI 130 can be implemented in the context of a "windows" system. It can be appreciated, of course, that other types of systems are possible. For example, rather than a traditional "windows" system, other operation systems such as, for example, a real time operating system (RTOS) more commonly employed in wireless systems may also be employed with respect to operating system 310 and interface 315. The software application 305 can include, for example, module(s) 125, which can include instructions for carrying out steps or logical operations such as those shown and described herein.

The following description is presented with respect to the present embodiments, which can be embodied in the context of a data-processing system such as computer system 100, in conjunction with program module 125, and data-processing system 200 and network 202 depicted in FIGS. 1-2. The present embodiments, however, is not limited to any particular application or any particular environment. Instead, those skilled in the art will find that the system and method of the present embodiments may be advantageously applied to a variety of system and application software including database management systems, word processors, and the like. Moreover, the present embodiments may be embodied on a variety of different platforms including Macintosh, UNIX, LINUX, and the like. Augmented Reality Markup Language (ARML) associated with the Open Geospatial Consortium (OGC) which consists of XML grammar, as well as ECMAScript, can be used in certain embodiments. SDKs such as CloudRidAR, ARToolKit, Catchoom CraftAR, Mobinett AR, Wikitude, Blippar, Layar, Meta, and ARLab can be used in certain embodiments. Therefore, the descriptions of the exemplary embodiments, which follow, are for purposes of illustration and not considered a limitation.

The embodiments disclosed herein provide methods and system that enable the creation of scenarios in virtual and/or augmented reality. The methods and systems provide library features where a user can predefine environments (for example, a hazardous area, safety zone, etc.). The methods and systems also allow a user to create a new environment by allowing the user to video record a real-world work place and convert the recording into VR and/or an environment for training a task.

The system can also perform task-based evaluation of trainee behavior. The task-based evaluation can be focused on safe behaviors. The safe behaviors can include lockout tag out procedures, use of correct personal protection equipment (PPE), not doing a task until conditions are safe for the task to be done, etc.

The embodiments can support record keeping of each user's safety behaviors and can also define the frequency of evaluation based on user's responses. This record keeping provides the following advantages. The records allow for the formulation of occupational, health and safety management systems (OHSMS) with the establishment of an occupational, health and safety (OHS) manual in which the scope of OHSMS is determined; the records facilitate establishment of an occupational, health, and safety policy and OHS objectives and programs; they ensure document and record control; they allow implementation and maintenance of a procedure to identify hazards, assess risk, and determine controls in the work place; they aid in maintenance of procedures to ensure applicable occupational, health, and safety legislation is identified, communicated within and compliance assessed; they define resources, roles, responsibilities, accountability, and authority with regard to the OHSMS; they can be used to implement an adequate occupational, health, and safety communication, participation, and consultation process; they help maintain good operational control; they help in planning emergency preparedness and response; they allow monitoring and measurement of the occupational, health, and safety performance of the organization; and provide a means to audit the system and review the system at a management level periodically.

The data collected according to the systems and methods disclosed herein can be used in various audit applications to ensure a workplace is compliant.

Figure 4:
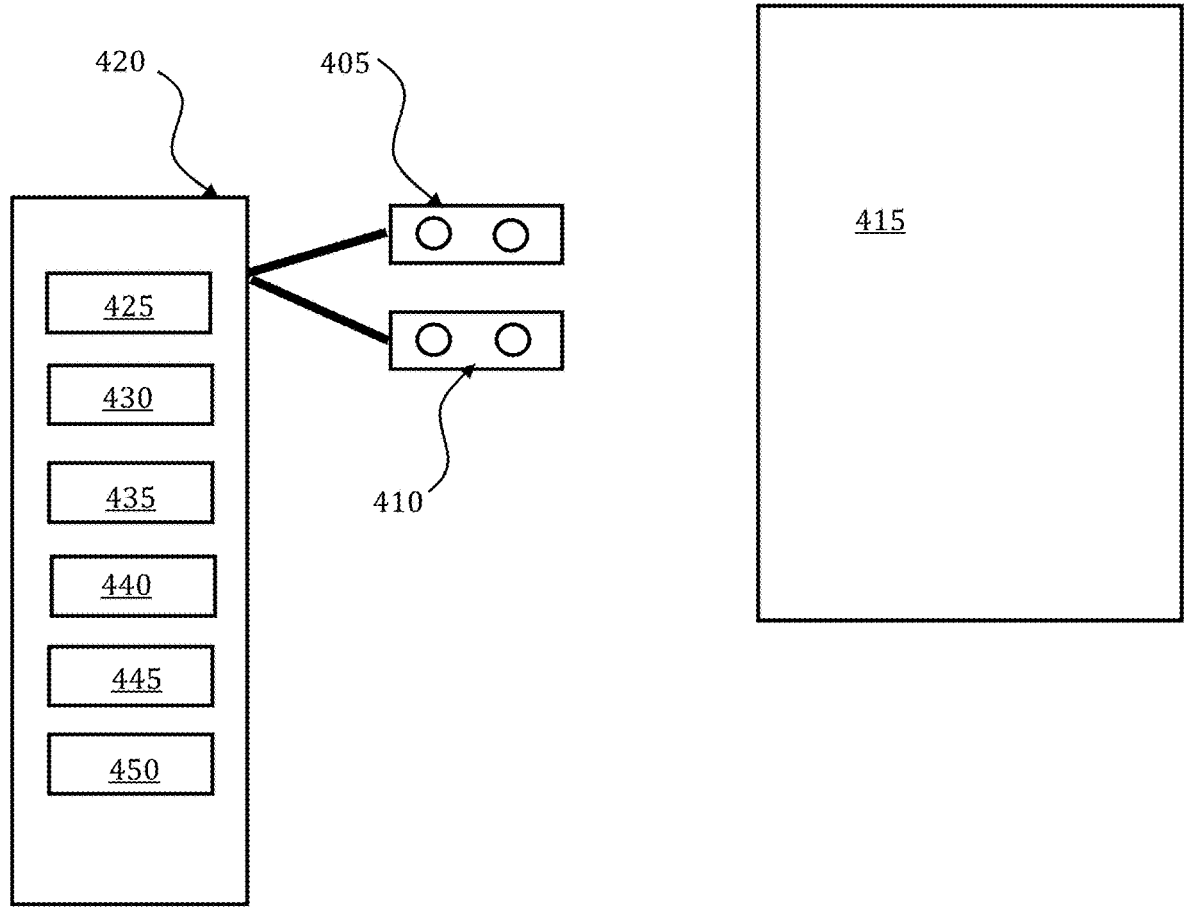
FIG. 4 depicts a block diagram of a system for virtual reality/augmented reality safety training and evaluation in accordance with the disclosed embodiments.

FIG. 4 provides a system diagram of an augmented reality/virtual reality system 400 for simulating an environment and evaluating trainee behaviors. The system includes a virtual reality headset 405 and/or an augmented reality headset 410.

Virtual reality headset 405 is a wearable head-mounted device that provides a virtual reality experience for a trainee. VR headset 405 can be used for providing simulations and training scenarios. In general, VR headset 405 includes a display that provides different images for each of the user's eyes respectively (e.g., a stereoscopic display). A variety of sensors, including accelerometers, gyroscopes, image or video recording devices, optical tracking sensors, and/or other such sensors can be incorporated in the VR headset 405, or can be provided externally to the VR headset 405 in order to track the trainee's movement. In certain embodiments, the VR headset can provide a display that mimics some or all of a real-world environment 415.

A processing system can be connected to VR headset 405. In certain embodiments, the processing system can be configured as an onboard processor and memory. In other embodiments, the processing system can be connected to the VR headset display as illustrated in FIGS. 1 and 2. The processing system requires a specialized graphics processing unit in order to render frames at high frequently, in order to reduce latency. A number of processes can be used to reduce latency and improve the user's experience.

Augmented reality headset 410 comprises a viewing device that can provide a direct or indirect view of a real-world environment 415 where certain aspects of the environment 415 are modified by an AR processing system associated with a computer 100. In general, augmentation of the real-world can be performed in real-time so that a user is provided contextually relevant information as the events in the real world transpire.

In certain embodiments, the augmented reality headset 410 can be used to allow the user to manipulate real and/or augmented features of the environment 415. In some embodiments, a computer system can be used to overlay objects or images on real-world features.

In general, AR headset 410 includes a processor, display, sensors, and input devices as disclosed with respect to VR headset 405 and in accordance with FIGS. 1-3 described above. In particular, the AR headset can incorporate sensors including video or still imaging devices, accelerometers, GPS, gyroscopes, etc. It should be appreciated that various technologies can be incorporated in AR headset 410 for rendering, including optical projection systems, monitors, hand held devices, and display systems. Some or all of these technologies can be used or worn by a user.

Both VR headset 405 and AR headset 410 belong to the class of devices commonly known as a head mounted display (HMD). These devices are generally worn by a user and render video or imagery of real-world or virtual objects in the trainee's field of view. In some embodiments, the sensors associated with VR headset 405 and/or AR headset 410 allows the system to pair virtual data to the associated physical environment and adjusts accordingly.

In certain embodiments, the AR headset 410 and/or VR headset 405 can be embodied as devices resembling eyewear. The embodiments can take advantage of incoming video and audio data in order to re-display the real world with overlays associated with the training exercise. The imagery can be projected through or reflected off the surfaces of the AR device 410 and/or VR device 405. In the embodiments disclosed herein, additional AR headsets or VR headsets can be provided so that collaborative training exercises are possible. In certain embodiments, the AR and/or VR headsets disclosed herein can be embodied as commercially available AR or VR headsets such as Google glass, Oculus Rift, HTC Vive, or other such devices. In other embodiments, the headsets can be embodied as contact lenses.

In certain embodiments, tracking technologies that make use of the sensors integrated in the headset such as imaging and video devices, other optical sensors, accelerometers, GPS enabled devices, solid state compasses, gyroscopes, RFID devices, and wireless sensors, can be used to track the user's motion in the real world and match that motion to the virtual experience. The position and orientation of the user's head is important in order to prevent lag that may result in disorientation, nausea, and other undesirable side effects.

In the embodiments disclosed herein, one or more AR headsets 410 and VR headsets 405 can be networked with a server or other such computing device 420. This can be embodied as a standalone computer 110, mobile device, etc. In certain embodiments, control of the training exercise can be made via speech recognition systems 425 that translates the trainee's speech into computer instructions. The speech recognition system can include a microphone or other sound collecting device associated with the speech recognition system 425, AR headset 410, or VR headset 405. Gesture recognition systems 430 can interpret a user's body movements from sensors via the manipulation of a peripheral device including a wand, stylus, pointer, glove, or other such device.

The computer system 420 can be used to integrate the user's movements and commands with the real and/or virtual environment. AR module 435 and/or VR module 440 receives input from the sensors and controls the virtual environment the user experiences. This process is known as "image registration" and can be accomplished in any of a number of ways.

"Computer vision" represents one possible method for controlling the user's experience. Computer vision generally includes two basic steps. The first is to identify points of interest, markers or optical flow in the data received from the AR device. Feature detection, edge detection, blob detection, thresholding, and other such processing techniques can be used. In the next step, real world coordinates can be restored from the data derived during the first step.

The system 400 can be used to present a virtual reality and/or augmented training experience for the user. The user's decision making can be collected and stored during the virtual reality and/or augmented reality exercise for further processing via review module 445. This allows the trainee's actions to be collected, cataloged, and evaluated. The system 400 can further have a database of training modules 450. A user can review the database of training modules via the AR and/or VR headset and select the desired training module.

It should be appreciated that the embodiments disclosed herein are also platform independent. As such, they can be used with mobile devices or platforms, VR and/or AR specific platforms, or other such devices.

Figure 5:
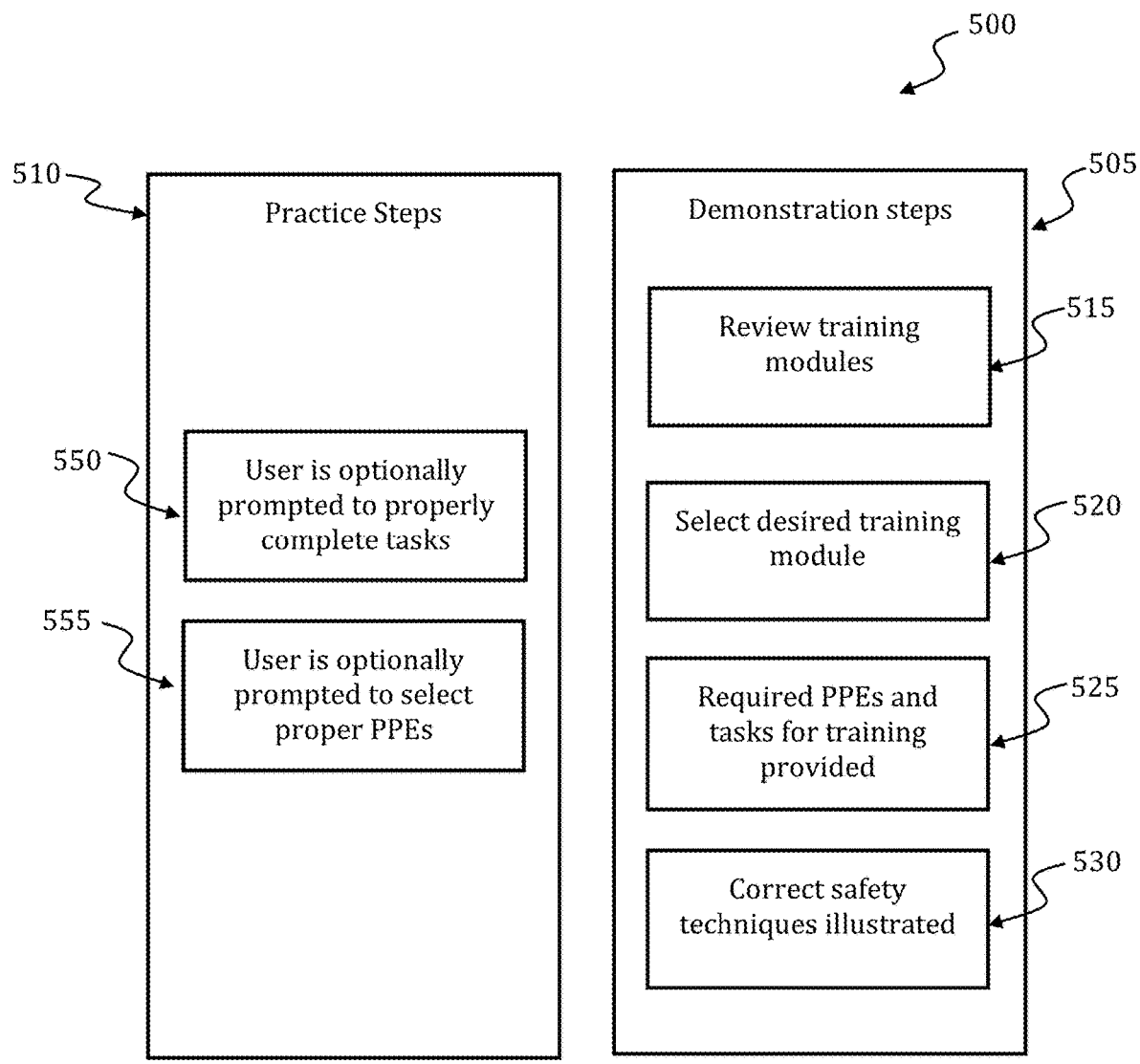
FIG. 5 depicts a block diagram of a method for virtual reality/augmented reality safety training and evaluation in accordance with the disclosed embodiments.

FIG. 5 illustrates a method 500 for demonstrating and practicing safe behaviors using the system 400. The method includes two basic steps, the demonstration phase 505 and the practice phase 510. The system 400 can have a database of training modules 450. In the demonstration phase 505, a user can review the database of training modules via the AR and/or VR headset as shown at 515 and select the desired training module at 520. In certain embodiments, the module can be exclusively virtual. In another embodiment, the module can combine virtual reality with real actions and/or augmented reality (e.g., removing a lock out tag).

Once the user selects the training module, the required personal protective equipment (PPE) for the task can be provided for the user to review as shown at 525. In addition, the correct technique for safely accomplishing the task can be shown to the user through the AR/VR system as illustrated at 530.

In certain embodiments, a second set of practice steps can be included in practice phase 510. The user can be required to virtually, or actually select and don, engage, or otherwise wear, the required PPEs as part of the exercise as shown at 555. The user can also be presented with a set of actions to be taken, and/or can be required to safely complete the tasks as illustrated in the demonstration steps at 550.

In an exemplary embodiment of a specific application of the method 500, zone identification and PPE usage can be the subject of a training module. In such an embodiment, the user is informed about various hazardous zones in the virtual environment. Recall the virtual environment can be a plant, manufacturing facility, office, or other such environment that replicates the real-world environment where training is desired. Zone specific PPE requirements will be presented to the user and the user will be shown correct ways to wear the PPE for the specific zone.

Tasks required for the training exercise can also be presented to the user. In the practice phase, the user will be required to select the proper PPEs for the environment and/or to accomplish the desired tasks. When the user attempts to virtually enter the zone, the system will check to ensure the correct PPEs are selected.

In another exemplary scenario, the system 400 and method 500 can be used to train a user to prepare a pump for maintenance. In such an embodiment, the training module for pump maintenance preparation can be selected. The virtual pump skid can be setup, while, for example, the switch box can be a real switch box. The training module can require the trainee to take a lock out and put a tag on the pump. The trainee can first be provided a selection of PPEs required for the exercise (if any). Next a virtual demonstration of the proper protocol for taking out a lock and tagging the pump can be provided. The virtual/augmented training module then requires the trainee to select the PPEs required for the task and then remove the lock and tag the pump, giving the trainee a real feel for the lock out task.

In yet another exemplary embodiment, a fire exit drill can be provided as a training module. In this case, when the fire exit drill training module is selected, a layout of a facility with fire exit indicators and fire exit doors can be provided to the user. The user can then be asked to actually or virtually navigate out of facility by following the fire escape routes from different location in facility in virtual reality. In certain cases, a simulated fire can be provided in the environment restricting access via certain routes. This can give the user the sense of a real fire exit without exposing the user to the risks associated with a real fire.

In another embodiment, the system 400 can be used to evaluate safe behaviors. The evaluation can be a task-based approach where the training module includes an end task that can be assigned to the user. As the user completes the task, the user's behaviors can be monitored by the system 400.

Figure 6:
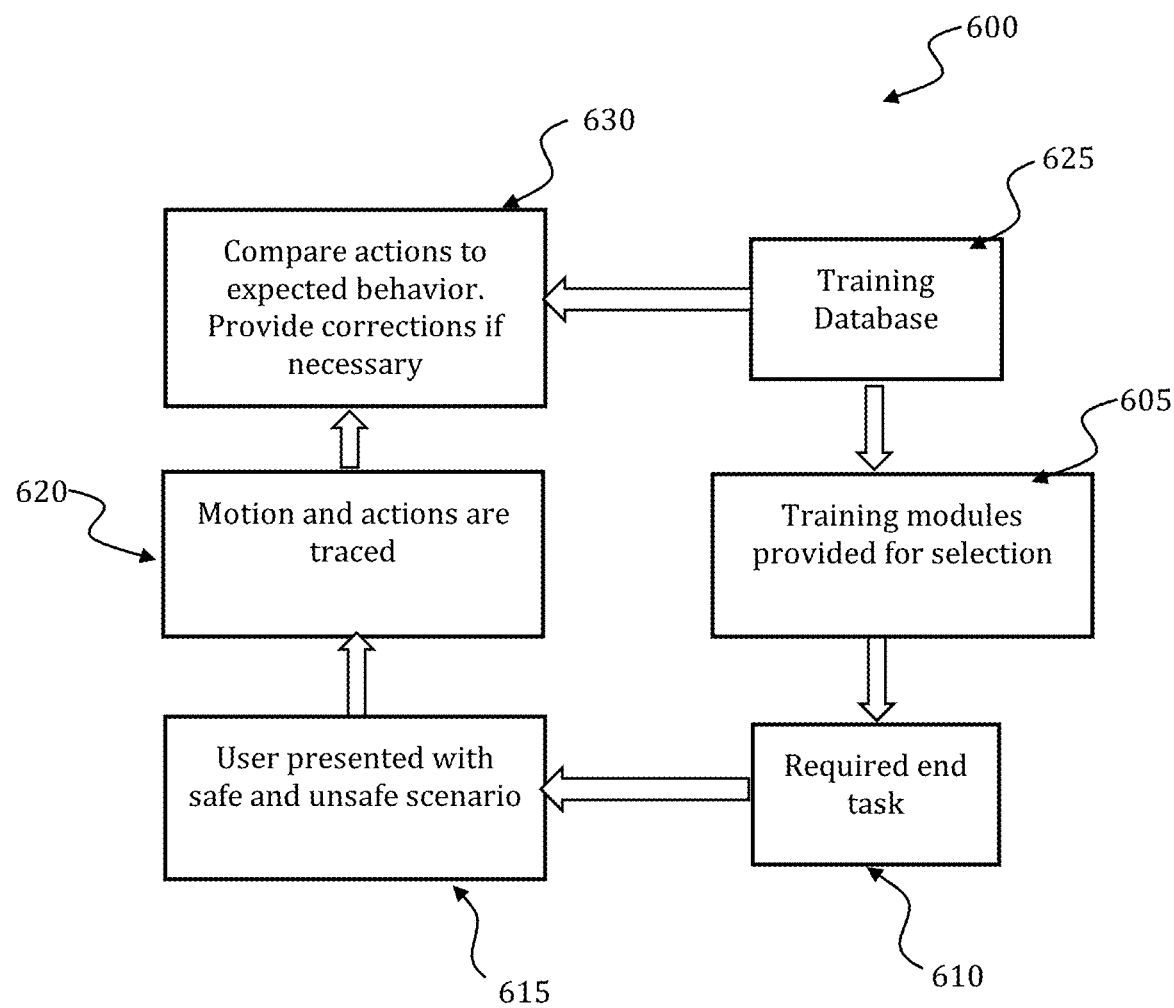
FIG. 6 depicts a block diagram of a method for virtual reality/augmented reality training in accordance with disclosed embodiments.

FIG. 6 illustrates a method 600 for evaluating/training safe behaviors. The user can be presented with, and select, a desired training module at 605. The training module can include a required end task such as, for example, taking a reading from a gauge, as shown at 610. In some cases, the trainee can be presented with both safe and unsafe scenarios associated with the task as shown at 615. As the user completes the task, the user's actions and motions can be collected and provided to the review module at 620. In addition, the training module can use the methods stored in the training data base at 625 to compare the expected behavior to the user's actual behavior 630. If the trainee's behavior is unsafe, the system can inform the user of the unsafe behavior and the trainee can be required to correct the unsafe behavior.

For example, in one example embodiment of the method 600, the user can be assigned a task requiring the user to extinguish an electrical fire. The system 400 can present a virtual fire so that the trainee is not exposed to the risk of a real fire. However, the user can be presented with a variety of either real or virtual fire extinguishers to choose from. The evaluation will be based on which extinguisher the trainee chooses while performing the task.

In another exemplary embodiment, a trainee can be tasked with taking a reading from a transmitter. To take the reading the user can be required to use scaffolding. The evaluation for the task can thus be on whether the user checks the scaffolding to determine if it has a "good to use" tag. In this way, the systems and methods disclosed herein help to determine when the user is put in a real-life situation, what the user's likely response will be (i.e., does the user follow safe behavior protocol).

Figure 7:
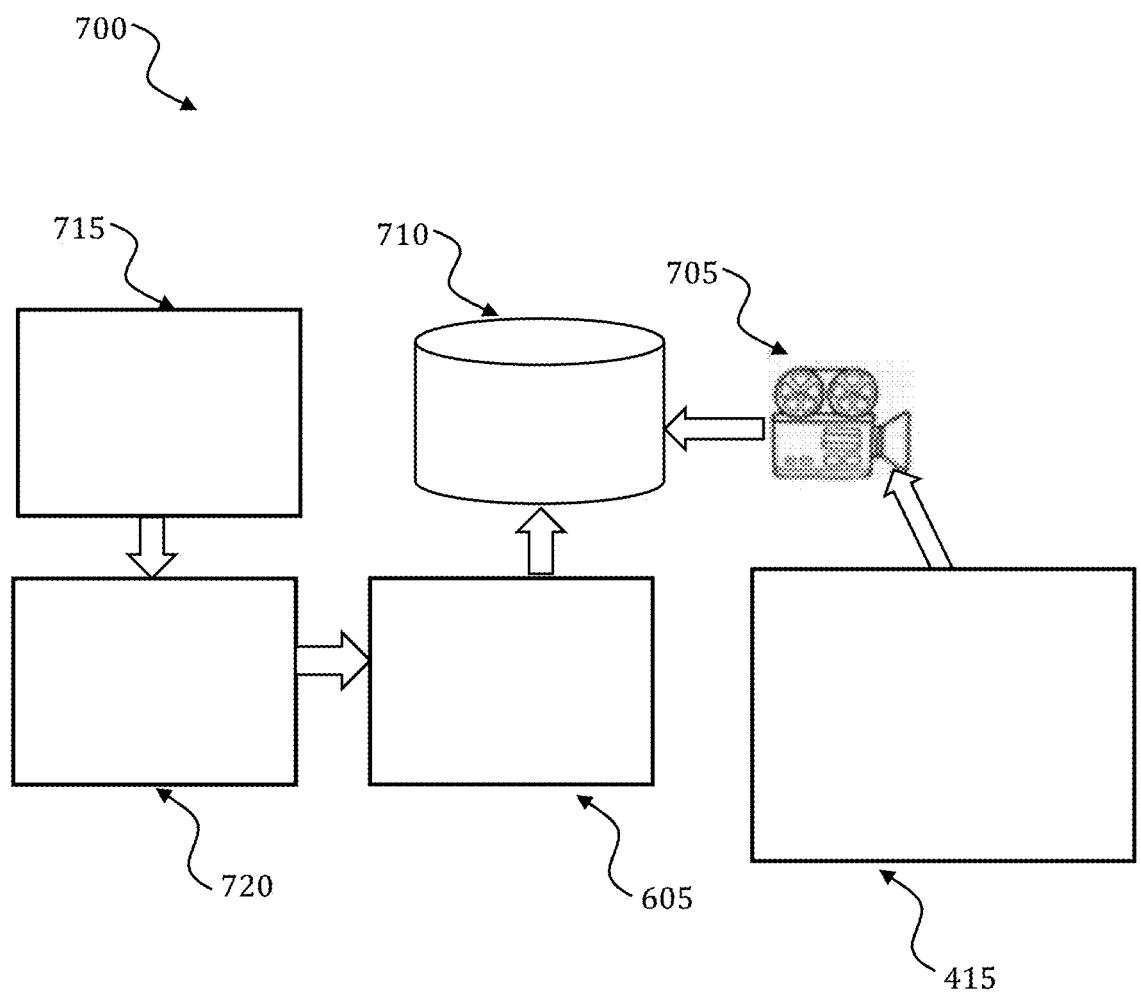
FIG. 7 depicts a block diagram of a method for virtual reality/augmented reality recording in accordance with the disclosed embodiments.

In another embodiment, a method 700, illustrated in FIG. 7, can be used for video capture of a real work place. The video data can be converted to virtual space, in order to provide a life like look and feel to the virtual environment the user experiences. As shown in FIG. 7, as video 705 is collected of the real-world environment 415, it can be committed to storage 710. The stored video can be used to develop virtual or augmented training environments 715 that can be added to the training environment library 720. The training environment libraries 720 can then be added to the training modules 605.

The method 700 can be extended to allow the user to create a personal library of scenarios that provide a realistic view of an environment. The training environment libraries can also be used for training any new employee, visitor, or contractor so that they can become familiar with work place, hazards, and escape routes associated with the facility.

In another embodiment, record keeping and scheduling of training exercises can be provided by the system 400. Specifically, personal training records can be kept and can used for safety auditing. Competency and behavior evaluation frequency of training can be suggested by the system for each individual based on their personal training record.

Figure 8:
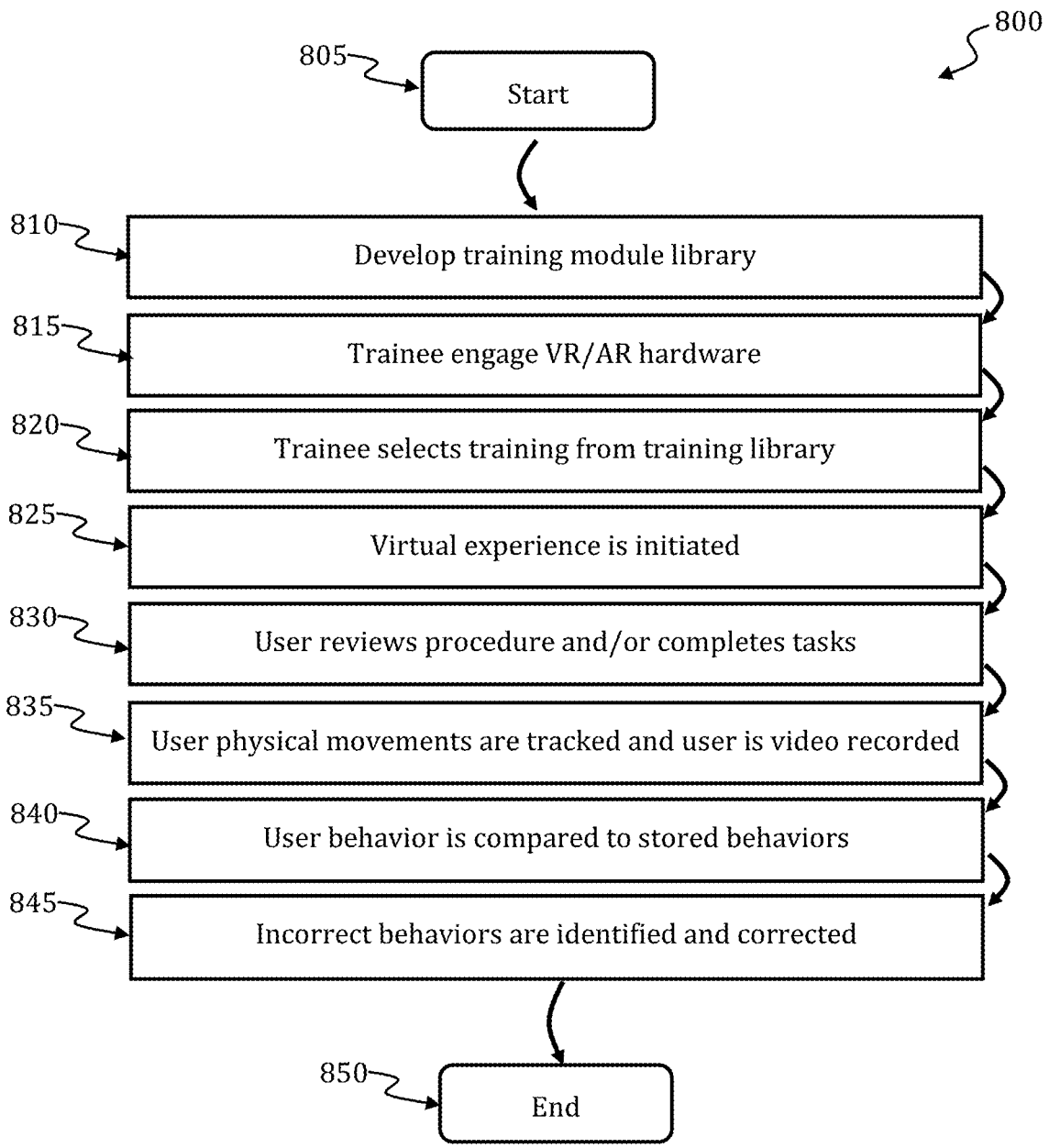
FIG. 8 depicts a flow chart of logical operational steps associated with a method for virtual reality/augmented reality safety training and evaluation in accordance with the disclosed embodiments.

FIG. 8 illustrates a method 800 for augmented reality/virtual reality training as disclosed herein. The method begins at step 805. At step 810, a training module library, as disclosed herein, can be developed. This can include the use of video recording to develop a training environment library, and recording a specific user's actions to develop a user profile.

At step 815, a trainee can engage with a system 400 and use an AR and/or VR headset to participate in a training exercise. The trainee can select the desired training from the training module library at step 820. At this point, the trainee can engage in the virtual training experience(s) at step 825 This can include reviewing safety procedures or safety information and/or identifying and properly using safety equipment or clothing, properly completing certain tasks safely, etc., as illustrated at step 830.

The system can monitor and collect both the user's physical movements and video of the user as the user completes the required safety training tasks as shown at step 835. The user behaviors can be compared to exemplary or desired behaviors stored by the system as illustrated at step 840. Any incorrect behaviors can be identified and corrected as shown at step 845. The method then ends at step 850.

The systems and methods disclosed herein are thus independent of any specific industry and can be used in a variety of industries. The systems and methods help prepare employees for the risks and changes faced in real time. Furthermore, the system 400 can record the real time plant/work environment and can use it as a basis for the simulated environment the trainee with experience during training. As such, a library of environments can be collected and stored for use and reuse in new virtual or augmented training exercises. The review module can be used to collect and evaluate behaviors and suggest the corrective actions. In certain embodiments, the review module can keep records for each employee/trainee and can schedule the frequency of training. Notable the embodiments are equally useful for visitors and contract workers visiting the site.

The disclosed embodiments allow users to do real life tasks without the hazard risks for such tasks (e.g., fire extinguishing). In certain embodiments, the systems can share virtual space so that multiple people can conduct one or more training exercises at the same time.

Based on the foregoing, it can be appreciated that a number of embodiments, preferred and alternative, are disclosed herein. For example, in an embodiment, a system comprises a headset for displaying at least one virtual object, at least one processor, and a storage device communicatively coupled to the at least one processor, the storage device storing instructions which, when executed by the at least one processor, cause the at least one processor to perform operations comprising: providing a virtual environment, providing one or more demonstration steps, providing one or more practice steps, collecting the user's real world physical movements, collecting the user's virtual decisions, evaluating the user's virtual decisions and physical movements to determine if the virtual decisions and the physical movements constitute safe behavior, and correcting an incorrect physical movement and an incorrect virtual decision. In an embodiment the headset comprises one of: a virtual reality headset and an augmented reality headset.

In one embodiment the one or more demonstration steps comprise illustrating an appropriate PPE, and illustrating an appropriate behavior to safely complete a task. In an embodiment the one or more practice steps comprise: prompting a user to select an appropriate virtual PPE, and prompting a user to perform an appropriate behavior to safely complete a task. In an embodiment the system further comprises comparing the user's performed behavior to safely complete the task with a stored set of acceptable behaviors to complete the task.

In an embodiment the system further comprises a video camera for collecting video data of a real-world location wherein the video data is converted to the virtual environment. In an embodiment the video data is used to construct the virtual environment, emulating the real-world location.

In another embodiment the virtual environment comprises at least one of: a plant, a manufacturing facility, an office, and a video recorded environment.

In another embodiment a training apparatus comprises a headset for displaying one or more virtual objects, at least one processor, and a storage device communicatively coupled to the at least one processor, the storage device storing instructions which, when executed by the at least one processor, cause the at least one processor to perform operations comprising: providing a virtual environment, providing one or more demonstration steps, providing one or more practice steps, collecting the user's real world physical movements, collecting the user's virtual decisions, evaluating the user's virtual decisions and physical movements to determine if the virtual decisions and the physical movements constitute safe behavior, and correcting an incorrect physical movement and an incorrect virtual decision. In an embodiment the headset comprises one of a virtual reality headset and an augmented reality headset.

In an embodiment the one or more demonstration steps comprise: illustrating an appropriate PPE and illustrating an appropriate behavior to safely complete a task. In an embodiment one or more practice steps comprise: prompting a user to select an appropriate virtual PPE and prompting a user to perform an appropriate behavior to safely complete a task. In an embodiment the apparatus further comprises comparing the user's performed behavior to safely complete the task with a stored set of acceptable behaviors to complete the task.

In an embodiment, the apparatus further comprises a video camera for collecting video data of a real-world location wherein the video data is converted to the virtual environment.

In an embodiment the virtual environment comprises at least one of: a plant, a manufacturing facility, an office, and a video recorded environment.

In yet another embodiment a training method comprises displaying at least one virtual objects with a headset, providing a virtual environment to the headset with at least one processor and a storage device communicatively coupled to the at least one processor, the storage device storing instructions which are executed by the at least one processor, providing at least one demonstration steps with the headset, providing at least one practice steps with the headset, collecting a user's real world physical movements with a sensor, collecting the user's virtual decisions, evaluating the user's virtual decisions and physical movements to determine if the virtual decisions and the physical movements constitute safe behavior, and correcting incorrect physical movements and incorrect virtual decisions.

In an embodiment the one or more demonstration steps comprise: illustrating an appropriate PPE and illustrating an appropriate behavior to safely complete a task. In an embodiment the one or more practice steps comprise: prompting a user to select an appropriate virtual PPE and prompting a user to perform an appropriate behavior to safely complete a task. In an embodiment the method further comprises comparing the user's performed behavior to safely complete the task with a stored set of acceptable behaviors to complete the task.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

What is claimed is:

1. A system comprising: a headset for displaying at least one virtual object; at least one processor; and a storage device communicatively coupled to said at least one processor, said storage device storing instructions which, when executed by said at least one processor, cause said at least one processor to perform operations comprising: providing a training module library including a use of a video recording to develop a training environment library and recording an action of a user to develop a user profile; providing a virtual environment based on the user profile, wherein the user profile comprises at least one demonstration step; providing the at least one demonstration step; providing at least one practice step; collecting real world physical movements associated with the user; evaluating the real world physical movements to determine if said real world physical movements constitute a safe behavior; and correcting an incorrect physical movement.

2. The system of claim 1, wherein said headset comprises at least one of:
a virtual reality headset; and
an augmented reality headset.

3. The system of claim 1, wherein said at least one demonstration step comprises: illustrating an appropriate Personal Protection Equipment (PPE) for a task; and illustrating an appropriate behavior to safely complete the task.

4. The system of claim 1, wherein said at least one practice step comprises: prompting a user to select an appropriate virtual Personal Protection Equipment (PPE) for a task; and prompting a user to perform an appropriate behavior to safely complete the task.

5. The system of claim 4 wherein:
a performed behavior of the user to safely complete said task is compared with a stored set of acceptable behaviors to complete said task.

6. The system of claim 1 further comprising:
a video camera for collecting video data of a real-world location wherein said video data is converted to said virtual environment.

7. The system of claim 6 wherein said video data is used to construct said virtual environment, emulating said real world location.

8. The system of claim 1, wherein said virtual environment comprises at least one of:
a plant;
a manufacturing facility;
an office; and
a video recorded environment.

9. A training apparatus, comprising: a headset for displaying at least one virtual object; at least one processor; and a storage device communicatively coupled to said at least one processor, said storage device storing instructions which, when executed by said at least one processor, cause said at least one processor to perform operations comprising: providing a training module library including a use of video recording to develop a training environment library and recording an action of a user to develop a user profile; providing a virtual environment based on the user profile, wherein the user profile comprises at least one demonstration step; providing the at least one demonstration step; providing at least one practice step; collecting real world physical movements of the user; evaluating the real world physical movements to determine if said physical movements constitute a safe behavior; and correcting an incorrect physical movement.

10. The apparatus of claim 9, wherein said headset comprises at least one of:
a virtual reality headset; and
an augmented reality headset.

11. The apparatus of claim 9, wherein said at least one demonstration step comprise: illustrating an appropriate Personal Protection Equipment (PPE) for a task; and illustrating an appropriate behavior to safely complete the task.

12. The apparatus of claim 9, wherein said at least one practice step comprises: prompting a user to select an appropriate virtual Personal Protection Equipment (PPE) for a task; and prompting a user to perform an appropriate behavior to safely complete the task.

13. The apparatus of claim 12 wherein a
performed behavior of the user to safely complete said task is compared with a stored set of acceptable behaviors to complete said task.

14. The apparatus of claim 9 further comprising:
a video camera for collecting video data of a real-world location wherein said video data is converted to said virtual environment.

15. The apparatus of claim 9, wherein said virtual environment comprises at least one of:
a plant;
a manufacturing facility;
an office; and
a video recorded environment.

16. A training method, comprising: displaying at least one virtual object with a headset; providing a training module library including a use of a video recording to develop a training environment library and recording an action of a user to develop a user profile; providing a virtual environment to said headset with at least one processor and a storage device communicatively coupled to said at least one processor, said storage device storing instructions which are executed by said at least one processor, wherein the virtual environment is based on the user profile, wherein the user profile comprises at least one demonstration step; providing the at least one demonstration step with said headset; providing at least one practice step with said headset; collecting a real world physical movements of the user with a sensor; evaluating the real world physical movements to determine if said physical movements constitute a safe behavior; and correcting incorrect physical movements.

17. The method of claim 16, wherein said at least one demonstration step comprises: illustrating an appropriate Personal Protection Equipment (PPE) for a task; and illustrating an appropriate behavior to safely complete the task.

18. The method of claim 16, wherein said at least one practice step comprises: prompting a user to select an appropriate virtual Personal Protection Equipment (PPE) for a task; and prompting a user to perform an appropriate behavior to safely complete the task.

19. The method of claim 18 further comprising:
   comparing a performed behavior of the user to safely complete said task with a stored set of acceptable behaviors to complete said task.

\* \* \* \* \*